United States Patent
Nath et al.

(10) Patent No.: US 7,564,485 B2
(45) Date of Patent: Jul. 21, 2009

(54) METHOD FOR DEACTIVATING AN IMAGE CAPTURING DEVICE WHEN PRESENT IN A RESTRICTED OR PROHIBITED ZONE

(75) Inventors: Sanjeev Nath, New York, NY (US); Rajesh Patel, Rocky Hill, CT (US)

(73) Assignee: Nattel Group, Inc., New York, NY (US)

( * ) Notice: Subject to any disclaimer, the term of this patent is extended or adjusted under 35 U.S.C. 154(b) by 594 days.

(21) Appl. No.: 10/741,855

(22) Filed: Dec. 20, 2003

(65) Prior Publication Data

US 2005/0134696 A1    Jun. 23, 2005

Related U.S. Application Data

(63) Continuation-in-part of application No. 10/673,725, filed on Sep. 29, 2003, now Pat. No. 7,065,349.

(51) Int. Cl.
*H04N 5/232* (2006.01)
*H04W 4/00* (2006.01)

(52) U.S. Cl. ............... 348/211.2; 348/211.6; 455/456.4

(58) Field of Classification Search . 348/207.99–207.1, 348/207.11, 211.99–211.2, 211.4, 211.6, 348/211.11; 455/456.4; 396/56
See application file for complete search history.

(56) References Cited

U.S. PATENT DOCUMENTS

| | | | |
|---|---|---|---|
| 3,034,287 A | 5/1962 | Odom et al. | |
| 3,955,560 A | 5/1976 | Stein et al. | |
| 4,031,991 A | 6/1977 | Malott | |
| 4,137,520 A | 1/1979 | Deveau | |
| 4,183,203 A | 1/1980 | Maezawa et al. | |
| 4,742,573 A | 5/1988 | Popovic | |
| 4,837,568 A | 6/1989 | Snaper | |
| 5,204,670 A | 4/1993 | Stinton | |
| D355,903 S | 2/1995 | Pollack et al. | |
| 6,052,065 A | 4/2000 | Glover | |
| 6,114,960 A | 9/2000 | Gilmour | |
| 6,650,894 B1 * | 11/2003 | Berstis et al. | 455/420 |
| 6,687,497 B1 | 2/2004 | Parvulescu et al. | |
| 6,690,956 B2 | 2/2004 | Chua et al. | |
| 2002/0070852 A1 | 6/2002 | Trauner et al. | |
| 2002/0106202 A1 * | 8/2002 | Hunter | 396/56 |
| 2002/0114626 A1 * | 8/2002 | Fukui et al. | 396/429 |
| 2003/0008662 A1 * | 1/2003 | Stern et al. | 455/456 |
| 2003/0207683 A1 * | 11/2003 | Lempio et al. | 455/422.1 |
| 2004/0046871 A1 * | 3/2004 | Ichikawa et al. | 348/207.99 |

FOREIGN PATENT DOCUMENTS

EP    1035746 A1    9/2000

OTHER PUBLICATIONS

Bluetooth, "All Products" from www.bluetooth.com.

(Continued)

*Primary Examiner*—Sinh N Tran
*Assistant Examiner*—Daniel M Pasiewicz
(74) *Attorney, Agent, or Firm*—Kelley Drye & Warren LLP

(57) ABSTRACT

The invention described is a method and system for preventing image capture and transmission in a restricted or prohibited zone.

13 Claims, 5 Drawing Sheets

OTHER PUBLICATIONS

Bluetooth, "What are some of the technical details of the Bluetooth wireless specifications?" from www.bluetooth.org.

Bluetooth, "In what kinds of products can I expect to find Bluetooth wireless technology?" from www.bluetooth.org.

Bluetooth, Bluetooth Enabled Products-Handheld Gryphon BT100-CS Bluetooth Cordless System from www.bluetooth.com.

Datalogic, Products from www.datalogic.com.

Infrared Data Association (IrDA), "IrDA Specifications and Technical Notes" from www.irda.org.

Infrared Data Association, "Point and Shoot Profile," Version 1.1, Mar. 20, 2000 from www.irda.org, pp. 1-34.

Polgreen, Lydia, New York Times, "To Get the Phone, Drivers are Willing to Risk Getting a Ticket," Sep. 2, 2003.

Job, Ann, "How to Deal with Distracted Drivers," report from http://Autos.msn.com/advice.

\* cited by examiner

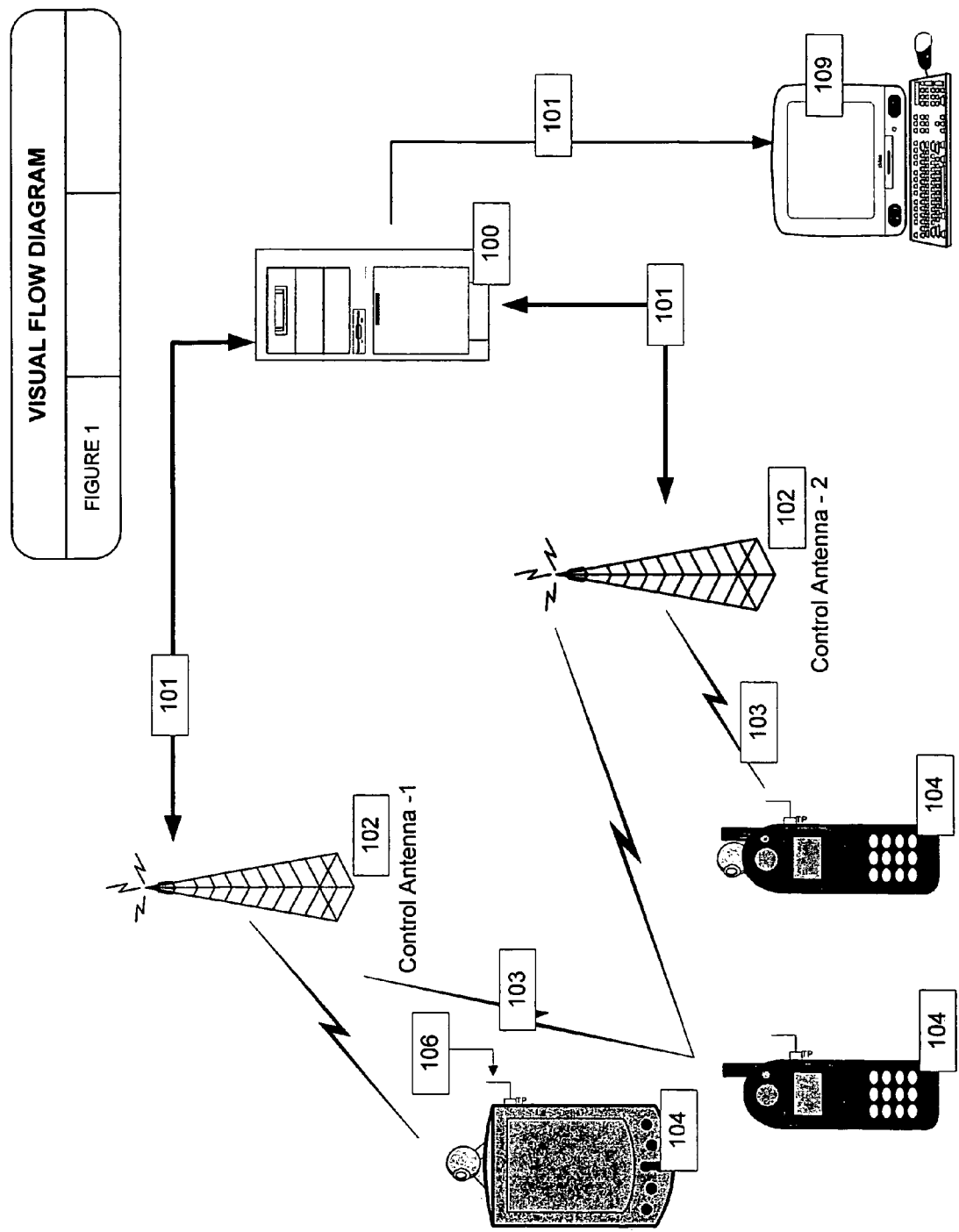

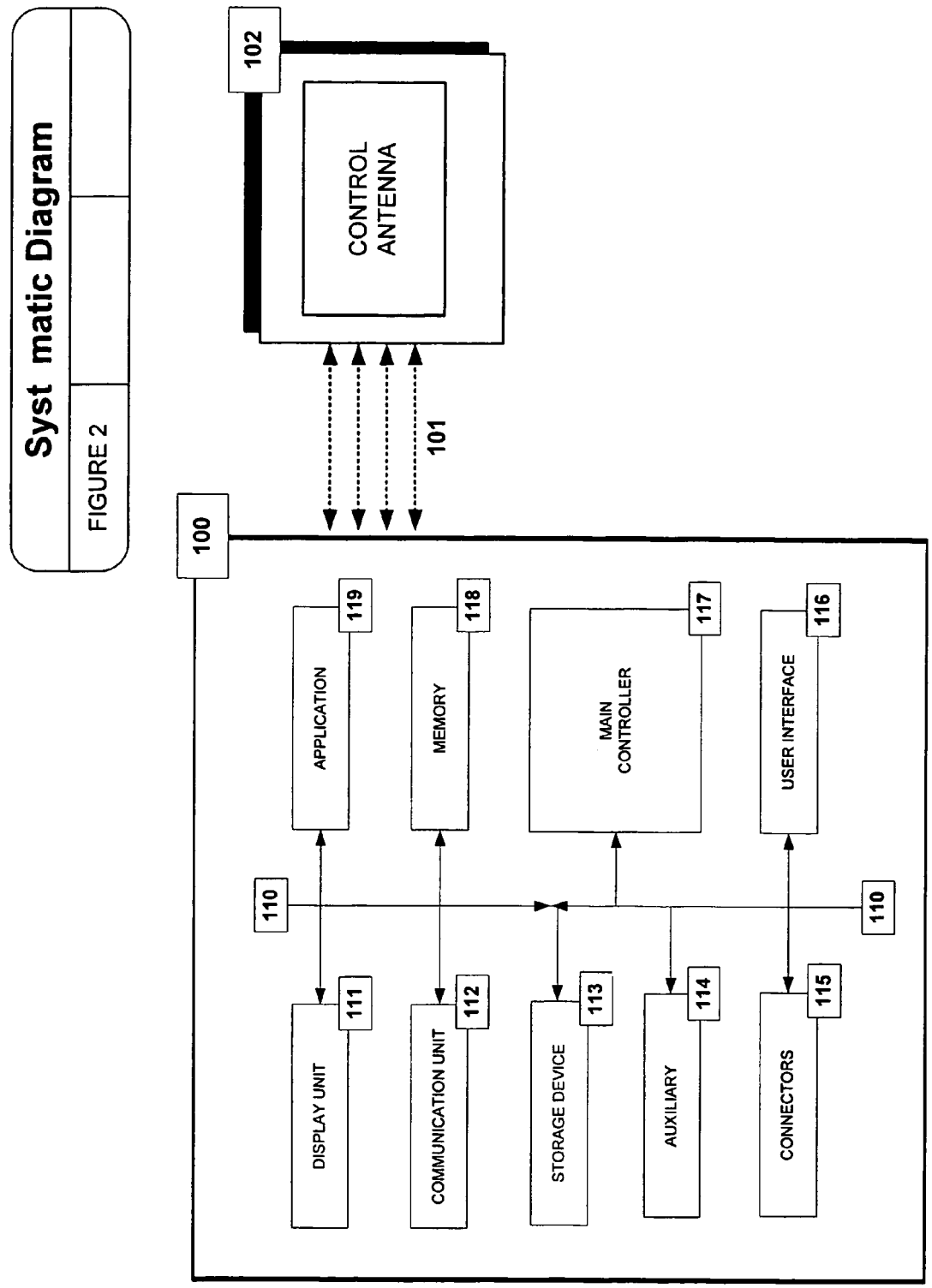

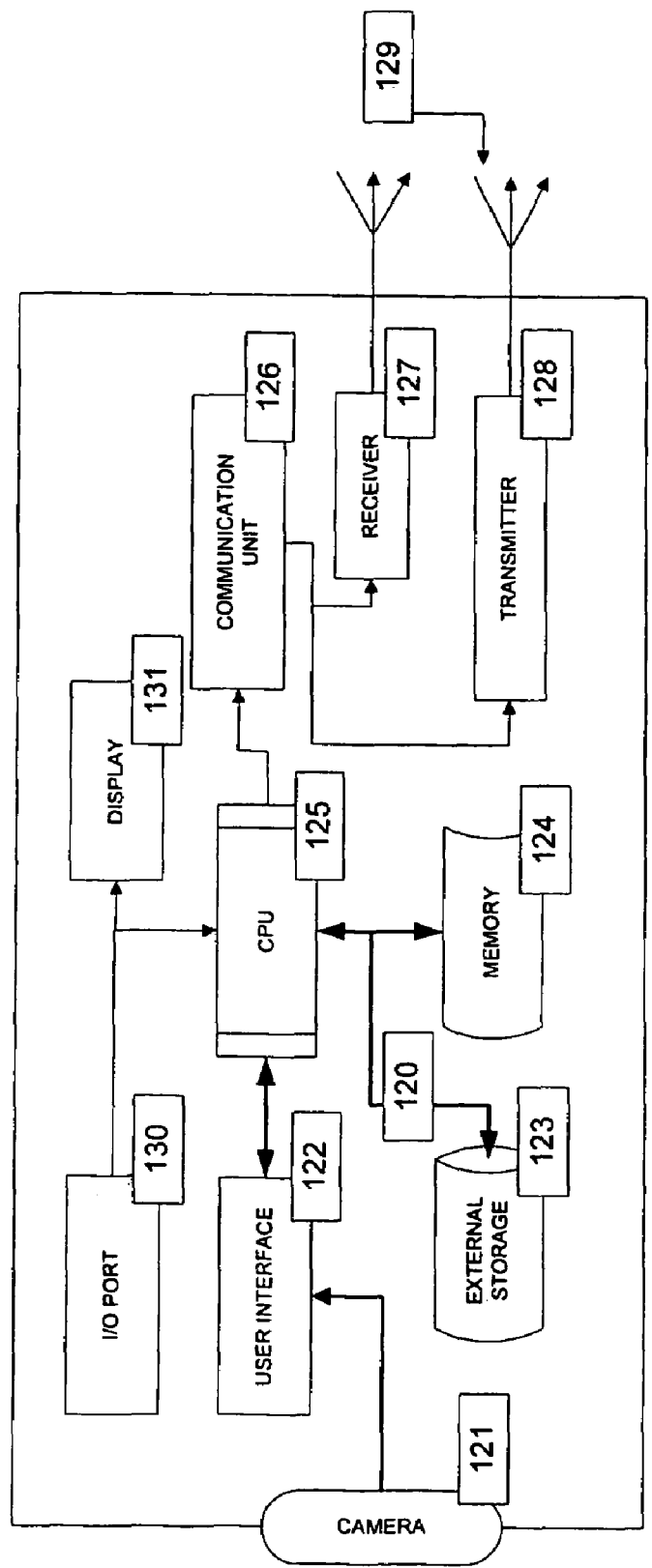

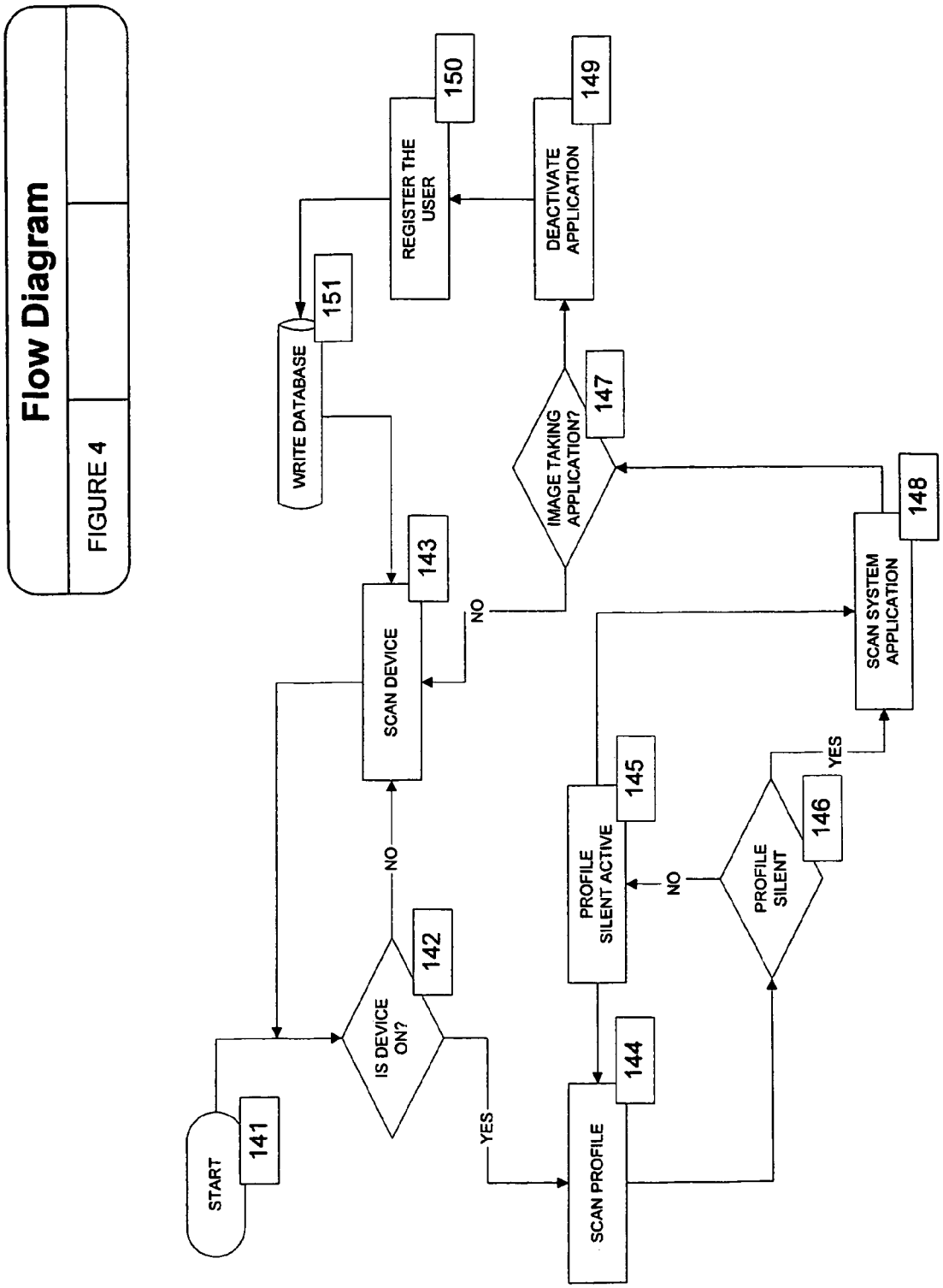

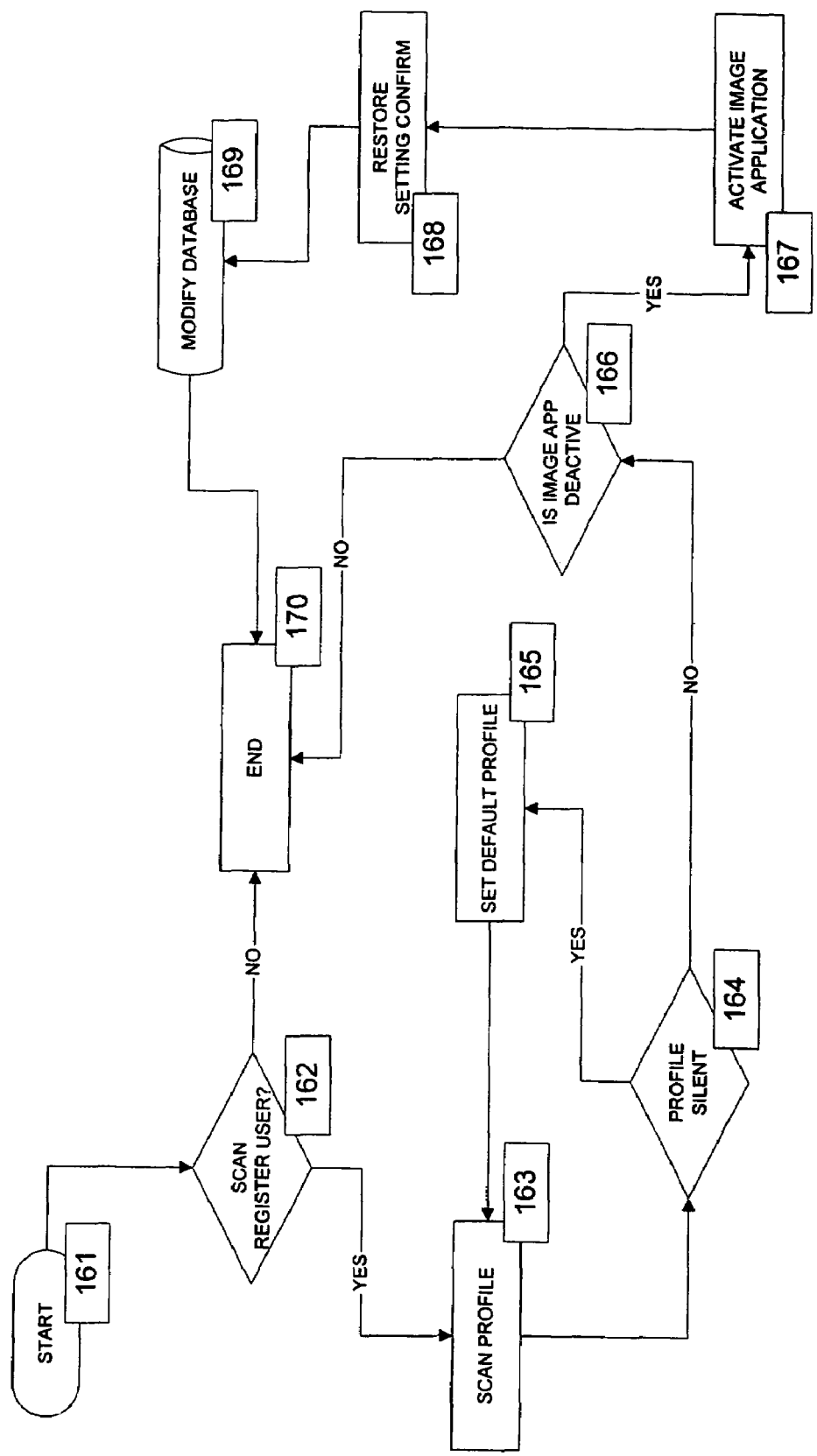

METHOD FOR DEACTIVATING AN IMAGE CAPTURING DEVICE WHEN PRESENT IN A RESTRICTED OR PROHIBITED ZONE

RELATED APPLICATIONS

This application is a continuation-in-part application of a U.S. patent application Ser. No. 10/673,725 filed Sep. 29, 2003 now U.S. Pat. No. 7,065,349, from which priority is asserted, and the disclosure of which is herein incorporated by reference in its entirety.

BACKGROUND

1. Field of Invention

The invention described and claimed herein relates to methods and systems for detecting an image capturing device whether or not mounted on a handheld wireless communications device. Specifically, it relates to methods and systems that prevent the use of an image capturing device in a restricted or prohibited zone.

2. Discussion of Related Art

Today, image capturing devices with or without wireless communication capability are not only compact and stylish but are of much more versatile than their bulky predecessors. The developments of image capturing devices with or without wireless communication capabilities increasingly facilitate a variety of functionalities via different networks including the Internet.

One of the most popular handheld wireless communication devices is the wireless phone. While the advancement of these technologies have greatly enabled flexible application of wireless phones, such ubiquitous use of wireless phones has also created new privacy hazards. This is true of other handheld wireless communications devices, e.g., without limitation, PDA's/mobile PCs. The use of an image capturing device with or without an handheld wireless communication device in a restricted or prohibited zone creates potential for abuse by a loss of privacy.

The problems associated with the use of an image capturing device with or without the hand held wireless communication device has become increasingly popular. It has reached the point that serious concerns are raised regarding the loss of privacy of the general public. Some countries have enacted, or are considering the enactment of legislation banning the use of image capturing devices with or without handheld wireless communication devices in a restricted or prohibited zone.

SUMMARY OF THE INVENTION

1. In one embodiment of the present invention there is disclosed a method for detecting an active image capturing device associated with, or not associated with, a handheld wireless communication device, said method comprising of the steps of: monitoring for an active profile image capturing device in an image-capturing restricted or prohibited zone and deactivating said image capturing device if the image capturing device is present within said restricted or prohibited zone. Optionally, the image capturing device may be deactivated by changing its active profile to "silent" mode or it may be reactivated upon leaving the restricted or prohibited zone. Optionally, the method may further comprise the step of restoring the pre-existing profile of the image capturing device. The image capturing device may be associated with a handheld wireless communication device selected from the group consisting of: a cellular phone; a PDA; and a mobile computing device. The image capturing device may be selected from the group consisting of: a miniature camera phone; a digital camera; and a mobile computing device with a camera. The image capturing device encompasses a device employing photography or a continuous mode of image capturing, wherein the continuous mode of image capturing may comprise any type of video filming including image streaming of live or recorded media transmission. The monitoring may be by wireless means selected from the group consisting of: WLan, Bluetooth, RF, and IrDA. The image capture device may be detected by monitoring the processes continuously being executed by the image capturing device over a certain period of time.

A restricted or prohibited zone of the present invention may be a zone wherein image capturing is prohibited.

BRIEF DESCRIPTION OF THE DRAWINGS

The invention claimed and described herein is described in terms of exemplary embodiments. These exemplary embodiments are described in detail with reference to drawings, which are part of the description of the invention. These embodiments are non-limiting exemplary embodiments, in which like reference numerals represent similar structures throughout the several views of the drawings, and wherein:

FIG. 1 depicts a exemplary architecture of an image capture detection system ("ICDS"), according to the first embodiment of the present invention;

FIG. 2 depicts an exemplary breakaway of application executed by ICDS, according to at least one embodiment of the present invention;

FIG. 3 depicts an exemplary flow diagram of a image capturing device with or without a handheld wireless communication device, according to at least one embodiment of the present invention;

FIG. 4 depicts an exemplary flow diagram of activation of the surveillance mechanism and deactivating the image capturing device by ICDS, according to at least one embodiment of the present invention;

FIG. 5 depicts an exemplary flow diagram of a restoration of the system application to a default setting by the ICDS, according to at least one embodiment of the present invention;

DETAILED DESCRIPTION

The invention is further described in detail referencing figures illustrating the systematic arrangement for ICDS interacting with an image capturing device associated with, or not associated with, a handheld wireless communication device.

FIG. 1 depicts an exemplary visual diagram of a ICDS, according to a first embodiment of the present inventions. In FIG. 1, the main image capture detection system 100 is monitoring the handheld wireless communication device with or without image capturing device 104. The main image capture detection system 100 can be hard wired or wirelessly connected to viewer/monitoring client 109. The control antennas 102 are hard wired 101 to the main image capture detection system 100. The control antenna 102 monitors the image capturing device 104 with or without handheld wireless communication device using radio frequency/Bluetooth/WLan protocols 103.

The signal beam 103 may cover no more than a predefined area. The signals beam 103 intercepts the image capturing device with or without handheld wireless communication device 104 through, a port 106 such as on the handheld wireless communication device 104. The port 106 may correspond to a WLAN or a Bluetooth or an IR port, where a WLAN system covers a diameter from 3 blocks to 30 miles, a blue tooth system covers a diameter range of around 330 feet and an "IrDA" infrared red system covers less than 5-10 feet in a direct line of sight.

WLan/Bluetooth/IR communication ports may be made available on most of the currently available handheld wireless communicating devices such as, without limitation, image capturing devices with or without cellular phones, PDA's, voice communicating PDA's and mobile PC's. Since many of the current and planned hand-held devices may be needed for performing a variety of other functions, such WLan/Bluetooth /IR ports on image capturing device with or without the handheld communication devices according to this invention would remain available for such other functions as well.

FIG. 2 depicts an exemplary breakaway of ICDS with an arrangement to ensure secure and safe communications according to a second embodiment of the present invention. In this embodiment, the main image capture detection system 100 is implemented at the operations center. The control antennas 102 are installed at regular intervals along the boundary of the restricted or prohibited zone. The main image capture detection system 100 consists of 9 major components: system bus 110, display unit 111, communication unit 112, storage device 113, auxiliary device 114, connectors 115, user interface 116, main controller 117, memory (RAM/ROM) 118, and system Application 119.

The main controller 117 is interfaced with a communication unit 112, a display unit 111, a auxiliary device 114 and user interface 116 which are shared by the same system bus 110. The system is mounted with a system application 119, which is stored on memory 118. An extra physical storage 113 and a set of connectors 115 are provided for further expansion.

The communication unit 112 comes mounted with a processor, a signal regulator, a transceiver adapter and a signal modulator/de-modulator.

FIG. 3 exemplary flow diagram of an image capturing device with or without the handheld wireless communication device according to a third embodiment of the present invention. In this embodiment, the image capture device 121 is connected to the user interface module 122. The device has an onboard central processing unit 125 and is interconnected to the various sub-components via a system bus 120. The system application runs on the processor 125 and provides control and coordinates the functions of the various components of the system. The system application is stored in Memory 124 which increases the overall performance of the communication system. The external storage 123 is provided where the sub-application components reside. The communication unit 126 is connected to receiver 127 and transmitter 128. The device is fully equipped with a display panel 131, a communication (I/O) port 130 and a signal enhancing antenna 129.

The I/O port may correspond to a RF, WLAN IEEE 802.11× & 802.16× standards, Bluetooth or an IR port, where the wireless 802.11× covers the area of about 3 block, the wireless 802.16× covers the area of about 30 miles, a blue tooth system covers a diameter range of approximately 330 feet and an "IrDA" infrared red system generally covers less than 5-10 feet in a direct line of sight. This technology as is described in greater detail below.

The Bluetooth wireless specification includes both link layer and application layer definitions for product developers which supports data, voice, and content-centric applications. Handheld wireless communication devices that comply with the Bluetooth wireless specification operate in the unlicensed, 2.4 GHz radio spectrum ensuring communication compatibility worldwide. These radios use a spread spectrum, frequency hopping, full-duplex signal at up to 1600 hops/sec. The signal hops among 79 frequencies at 1 MHz intervals to give a high degree of interference immunity. Up to seven simultaneous connections can be established and maintained. Further details can be viewed at www.bluetooth.org or www.bluetooth.com.

The IRDA specifications, on the other hand, is intended for high speed short range, line of sight, point-to-point cordless data transfer—suitable for handheld communication devices. Since 1984, "IrDA Data" defines a standard for an interoperable universal two way cordless infrared light transmission data port. IrDA technology is already in over 300 million electronic devices including PC's, PDA's, cellular phones, cameras, toys, watches and many other mobile devices. Main characteristics of IRDA signaling include:

Range: Continuous operation between two contacts for at least 1 meter.

Bi-directional communication is the basis of all specifications.

Data transmission starting from 9600 kbps primary speed going up to 4.0 mbps.

Data packets are protected using CRC (from CRC 16 for speeds up to 1.152 mbps to CRC-32 at 4.0 mbps)

Radio waves are created due to the movement of electrical charges in antennas. As they are created, these waves radiate away from the antenna. All electromagnetic waves travel at the speed of light. The major differences between the different types of waves are the distances covered by one cycle of the wave and the number of waves that pass a certain point during a set time period. The wavelength is the distance covered by one cycle of a wave. The frequency is the number of waves passing a given point in one second. For any electromagnetic wave, the wavelength multiplied by the frequency equals the speed of light. The frequency of an RF signal is usually expressed in units called hertz (Hz). One Hz equals one wave per second. One kilohertz (kHz) equals one thousand waves per second, one megahertz (MHz) equals one million waves per second, and one gigahertz (GHz) equals one billion waves per second.

RF energy includes waves with frequencies ranging from about 3000 waves per second (3 kHz) to 300 billion waves per second (300 GHz). Microwaves are a subset of radio waves that have frequencies ranging from around 300 million waves per second (300 MHz) to three billion waves per second (3 GHz).

Basically WLAN is an ordinary LAN protocol, which is a modulated carrier of radio frequency waves. WLAN IEEE 801.11 is a natural extension to LAN Ethernet, and the modulated protocol is IEEE 802.3 (Ethernet 3).

Common WLAN Products, which are using IEEE standards, are based on IEEE 802.11 and 802.11b specification. 802.11b is a high rate extension to the original 802.11, and specific 5.5 to 11 Mbps data rate. The next HyperLAN2 generation using IEEE 802.11a, IEEE 802.11g standards, operates in a new band frequency of 5 GHz, and achieves a high data rate as 54 Mbps. The new networking technology WiMax IEEE 802.16× should provide higher speed, and more coverage than existing Wi-Fi standards.

FIG. 4 depicts an exemplary flow diagram of activation of surveillance mechanism and deactivation of the image capturing device by ICDS in at least one embodiment of the present invention. Upon activation or start—step 141 the main image capturing device detection system scans the area for all the operational image capturing device (whether associated with or not associated with a handheld wireless communication devices)—step 142. If there is no activity on the network, the system continues scanning for the operational image capturing device (associated with or not associated with a handbeld wireless communication device)—step 143. If found, the system scans for the active profile on the image capturing device (with or without the handheld wireless communication device)—step 144.

The system scans for the "silent" profile on the handheld wireless communication device—step 146. If the "silent" profile is not active, the ICDS system activates the "silent" profile on the handheld wireless communication device—step 145. If the handheld wireless communication device is on the "silent" profile, the ICDS system scans the handheld wireless communication device for any active image capturing application—step 148. If there is any image capturing application 147 is activated on the handheld wireless communication device, the ICDS system deactivates the image capturing application—step 149. The ICDS system registers the user in the database—step 150. On successful completion of the transaction, the entire event is logged in the database—step 151, following which ICDS system resets itself on to a scan mode—step 143.

FIG. 5 depicts an exemplary flow diagram of restoration of the system application to a default setting by ICDS in at least one embodiment of the present invention. The main image capturing device detection system actively scans the area for all operational image capturing devices with or without the handheld wireless communication devices. If the user moves the image capturing device with or without the handheld wireless communication device out of the active zone—step 161, the ICDS system scans and matches the registered user with the database—step 162. if the register user identification data is found, the ICDS system checks for the profile—step 163. If the active mode is in a "silent" profile—step 164, the pre-existing profile is restored to the device and the "silent" profile is deactivated—step 165.

The ICDS system checks if the image capturing application is deactivated—step 166. If the image capturing application is deactivated, the ICDS system iestures the image capturing application to the active mode—step 167. The restored setting are once again confirmed with the database—step 168. The ICDS system modifies the database step—169 and returns to its scan mode—step 170.

The ICDS system checks if the image capturing application is deactivated—step 166. If the image capturing application is deactivated, ICDS system restores the image capturing application to the active mode—step 167. The restored settings are once again confirmed with the database—step 168. The ICDS system modifies the database—step 169 and returns to its scan mode.

We claim:

1. A method for detecting and controlling an operational image capturing device associated with a wireless communication device, said method comprising the programmed steps of:

monitoring for the presence of an operational image capturing device in an image-capturing restricted or prohibited zone, if said operational image capturing device is found, scanning for an active profile within said image capturing device, if said active profile is found, scanning for a "silent" profile within said wireless communication device and, if found, activating said "silent" profile;

if said "silent" profile is active, scanning for an active image capturing application within said wireless communication device;

if said active image capturing application is detected, deactivating said active image capturing application;

registering said image capturing device associated with the wireless communication device and logging the entire event in a database; and restoring said image capturing device active profile when the said image capturing device is no longer present within said restricted or prohibited zone.

2. The method of claim 1, wherein the image capturing device is deactixated by changing its active profile to a "silent mode".

3. The method of claim 1 wherein when the image capturing device is associated with a handheld wireless communication device, said handheld wireless communication device is deactivated by changing its active profile to "silent" mode.

4. The method of claim 1, further comprising the step of: restoring the profile of the image capturing device prior to its presence within said restricted or prohibited zone.

5. The method of claim 3, further comprising the step of: restoring the profile of the handheld wireless communication device prior to its presence within said restricted or prohibited zone.

6. The method of claim 1, wherein the image capturing device is associated with a handheld wireless commtmication device comprising: a cellular phone; a PDA; and a mobile computing device.

7. The method of claim 1, wherein the image capturing device comprises: a miniature camera phone; a digital camera; or a mobile computing device with a camera.

8. The method of claim 1, wherein said monitoring is by wireless means comprises: WLAN, Bluetooth, RF, or IrDA.

9. The method of claim 1, wherein the monitoring for the image capture device is by monitoring continuously the changing activity profiles of the image capturing device over a certain period of time.

10. The method of claim 1, wherein the restricted or prohibited lone is a zone wherein image capturing is prohihited.

11. The method of claim 1, wherein the image capturing device encompasses a device employing photography or a continuous mode of image capturing or streaming.

12. The method of claim 11, wherein the continuous mode of image capturing means any type of video filming.

13. The method of claim 11, wherein the continuous mode of image streaming means any type of live or recorded media transmission.

* * * * *

UNITED STATES PATENT AND TRADEMARK OFFICE
CERTIFICATE OF CORRECTION

PATENT NO. : 7,564,485 B2  Page 1 of 1
APPLICATION NO. : 10/741855
DATED : July 21, 2009
INVENTOR(S) : Sanjeev Nath and Rajesh Patel It is certified that error appears in the above-identified patent and that said Letters Patent is hereby corrected as shown below:

Column 6,
Claim 10, Line 47, now reads:

-- prohibited lone is a zone wherein image capturing is prohihited.

Column 6,
Claim 10, Line 47, should read as follows:

-- prohibited zone is a zone wherein image capturing is prohibited.

Signed and Sealed this

First Day of December, 2009

David J. Kappos
*Director of the United States Patent and Trademark Office*